United States Patent
Salenbien et al.

(10) Patent No.: US 10,029,595 B2
(45) Date of Patent: *Jul. 24, 2018

(54) CENTER ARMREST LOCK

(71) Applicant: FORD GLOBAL TECHNOLOGIES, LLC, Dearborn, MI (US)

(72) Inventors: Nicholas Salenbien, Dundee, MI (US); Thomas J. Susko, Saint Clair Shores, MI (US); Macit Aktas, Windsor (CA)

(73) Assignee: Ford Global Technologies LLC, Dearborn, MI (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/370,187

(22) Filed: Dec. 6, 2016

(65) Prior Publication Data

US 2017/0080836 A1 Mar. 23, 2017

Related U.S. Application Data

(63) Continuation of application No. 14/681,345, filed on Apr. 8, 2015, now Pat. No. 9,637,032.

(51) Int. Cl.
*B60N 2/75* (2018.01)
*B60N 2/90* (2018.01)

(52) U.S. Cl.
CPC ............. *B60N 2/757* (2018.02); *B60N 2/919* (2018.02)

(58) Field of Classification Search
CPC .... B60N 2/4606; B60N 2/4613; B60N 2/462; B60N 2/4633; B60N 2/442; B60N 2/757; B60N 2/919; B60N 2/933
USPC .... 297/113, 115, 117, 378.13, 411.3, 411.32
See application file for complete search history.

(56) References Cited

U.S. PATENT DOCUMENTS

| | | | |
|---|---|---|---|
| 3,168,346 A | 2/1965 | Rei et al. | |
| 4,579,384 A | 4/1986 | Sharod | |
| 4,904,003 A * | 2/1990 | Yamazaki | B60N 2/366 |
| | | | 292/126 |
| 5,100,202 A | 3/1992 | Hughes | |
| 5,476,307 A | 12/1995 | Whalen | |
| 5,658,043 A | 8/1997 | Davidson | |
| 5,873,633 A | 2/1999 | Lang et al. | |

(Continued)

FOREIGN PATENT DOCUMENTS

| | | | |
|---|---|---|---|
| DE | 3322511 A1 * | 1/1985 | ........... B60N 2/4613 |
| DE | 3825781 A1 | 2/1990 | |

(Continued)

OTHER PUBLICATIONS

Non-Final Rejection dated Mar. 21, 2016 for U.S. Appl. No. 14/676,203.

(Continued)

*Primary Examiner* — Ryan D Kwiecinski
(74) *Attorney, Agent, or Firm* — Vichit Chea; King & Schickli PLLC

(57) ABSTRACT

A locking assembly for a vehicle armrest includes a pivoting catch member disposed below an armrest body and a catch wire disposed on a seat back frame member. A retractable stop pin maintains engagement of the pivoting catch member and the catch wire. A release is operatively connected to the retractable stop pin, which may be urged into engagement with the pivoting catch member by a spring. Armrest and seat assemblies including the locking assembly are provided.

16 Claims, 6 Drawing Sheets

(56) References Cited

U.S. PATENT DOCUMENTS

| | | |
|---|---|---|
| 6,742,845 B2 | 6/2004 | Nock |
| 9,290,117 B2 * | 3/2016 | Goodhall ............. B60N 2/4613 |
| 2008/0129101 A1 | 6/2008 | Park |
| 2010/0244502 A1 | 9/2010 | Andersson et al. |
| 2014/0125107 A1 * | 5/2014 | Cha ...................... B60N 2/4613 |
| | | 297/411.3 |
| 2014/0319868 A1 * | 10/2014 | von Rothkirch und Panthen |
| | | ........................... B60N 2/4633 |
| | | 296/24.34 |

FOREIGN PATENT DOCUMENTS

| | | | |
|---|---|---|---|
| DE | 10120604 C1 * | 10/2002 | ........... B60N 2/4613 |
| DE | 102008030275 A1 * | 12/2009 | ........... B60N 2/4613 |
| DE | 102011102273 A1 * | 1/2012 | ........... B60N 2/4613 |
| DE | 102011114442 A1 * | 3/2013 | ............. B60N 3/101 |
| DE | 102014101996 A1 * | 8/2015 | ........... B60N 2/4613 |
| DE | 102014101996 A1 | 8/2015 | |
| EP | 0518358 A1 | 12/1992 | |
| FR | 2876639 A1 * | 4/2006 | ........... B60N 2/4613 |
| WO | WO-2011081627 A1 * | 7/2011 | ........... B60N 2/4613 |

OTHER PUBLICATIONS

Non-Final Rejection dated Jul. 26, 2016 for U.S. Appl. No. 14/681,345.

* cited by examiner

CENTER ARMREST LOCK

This utility patent application claims the benefit of priority in U.S. patent application Ser. No. 14/681,345 filed on Apr. 8, 2015, the entirety of the disclosure of which is incorporated herein by reference.

TECHNICAL FIELD

This disclosure relates generally to seats for motor vehicles, and more particularly to a locking mechanism for a seat center armrest.

BACKGROUND

Center seat armrests are well known in the art, and are used particularly with motor vehicle bench-type seats. The center seat armrest, as the name implies, provides a convenient place in a center portion of a seat for a passenger to rest his or her arm. Moreover, center seat armrests may be equipped with a variety of useful and convenient features such as storage bins, cup holders, and the like. Typically, a center seat armrest is configured to pivot, allowing the armrest to be translated between a stowed configuration (usually at least partially or fully nested within a recess in the vehicle seat back whereby a seat back for a passenger is provided) and a deployed, substantially horizontal configuration for use by adjacent passengers.

To deploy the armrest, usually it is necessary only to grasp the armrest or a handle or pull strap attached to the armrest and pull forward. A friction fit between the armrest and a receiver defined in the seat back could be relied on to keep the armrest in a stowed configuration. However, while convenient, this admits of inadvertent and undesired deployment of the armrest. For example, this could be caused by vehicle deceleration created by a frontal impact to the vehicle, causing an otherwise unrestrained center armrest to deploy.

To solve this and other problems, the present disclosure relates to a vehicle seat center armrest lock configured to retain the center armrest substantially in a stowed configuration even in the event of a frontal impact to the vehicle. Advantageously, the described lock automatically allows normal deployment of the center armrest by a user by simply actuating a release. However, in the event of a sudden deceleration such as would be caused by a frontal impact to the vehicle, the lock prevents inadvertent and undesired deployment of the armrest caused by the deceleration energy of the impact.

SUMMARY

In accordance with the purposes and benefits described herein, in one aspect of the present disclosure a locking assembly for a vehicle armrest is provided including a pivoting catch member disposed below an armrest body and a catch wire disposed on a seat back frame member. A retractable stop pin maintains an engagement of the pivoting catch member and the catch wire. A release, which may be a handle such as a pull strap, is operatively connected to the retractable stop pin. In embodiments, the retractable stop pin is urged into engagement with the pivoting catch member by a spring-loaded mechanism. In embodiments, the catch member pivots about a pivot pin disposed on an armrest frame member.

In another aspect, an armrest assembly for a vehicle including the locking assembly described above is provided.

In yet another aspect, a seat assembly for a vehicle is provided, including the armrest assembly and the locking assembly.

In the following description, there are shown and described embodiments of the disclosed vehicle seat center armrest locking assembly. As it should be realized, the locking assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed vehicle seat center armrest inertial lock, and together with the description serve to explain certain principles thereof. In the drawing.

Reference will now be made in detail to embodiments of the disclosed vehicle center armrest lock, examples of which are illustrated in the accompanying drawing figures.

DETAILED DESCRIPTION

Figure 1:
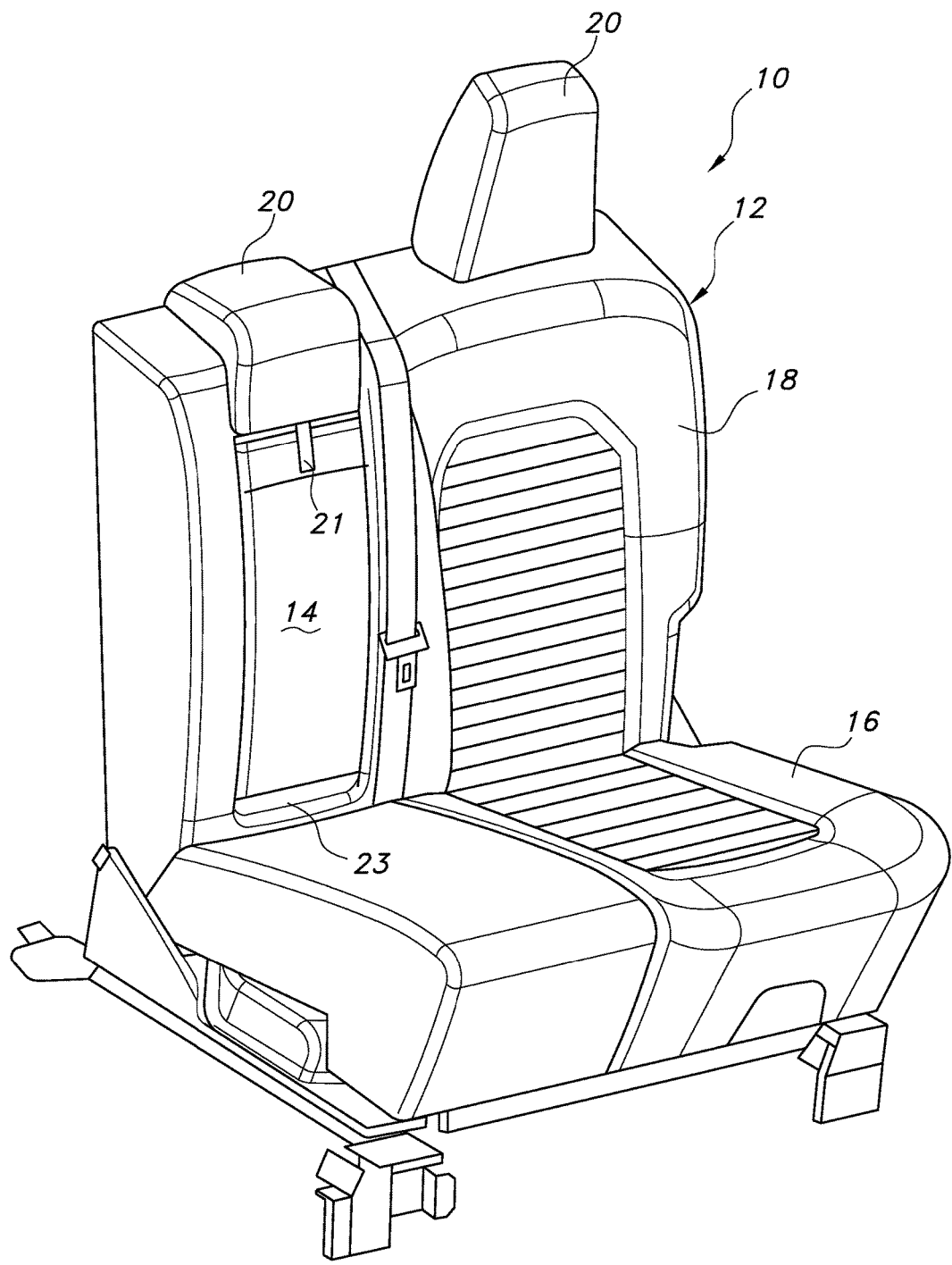
FIG. 1 depicts a portion of a vehicle bench-type seat including a center armrest.

FIG. 1 shows an exemplary seat assembly 10 for a vehicle, in the depicted embodiment being a partial view of a bench-type second row vehicle seat 12 including a pivoting seat center armrest 14. The seat 12, as is well known in the art, is defined by a frame (not visible in this view) defining a seat bottom 16 having seating areas for a plurality of passengers, a seat back 18, padding for passenger comfort, a cover, and fixed or deployable headrests 20. A handle 21 is included to allow deploying the armrest 14. As shown, armrest 14 is in an upright, stowed configuration within a cavity 23 defined in the seat back 18. For convenience, only a left and a center seating area of seat 12 are depicted, although as is known a right seating area will also be included in the conventional bench-type vehicle seat 10. It will be appreciated also that this embodiment is depicted for illustrative purposes only, and that the various structures and embodiments described below are equally adaptable to alternative vehicle seat types.

Figure 2:
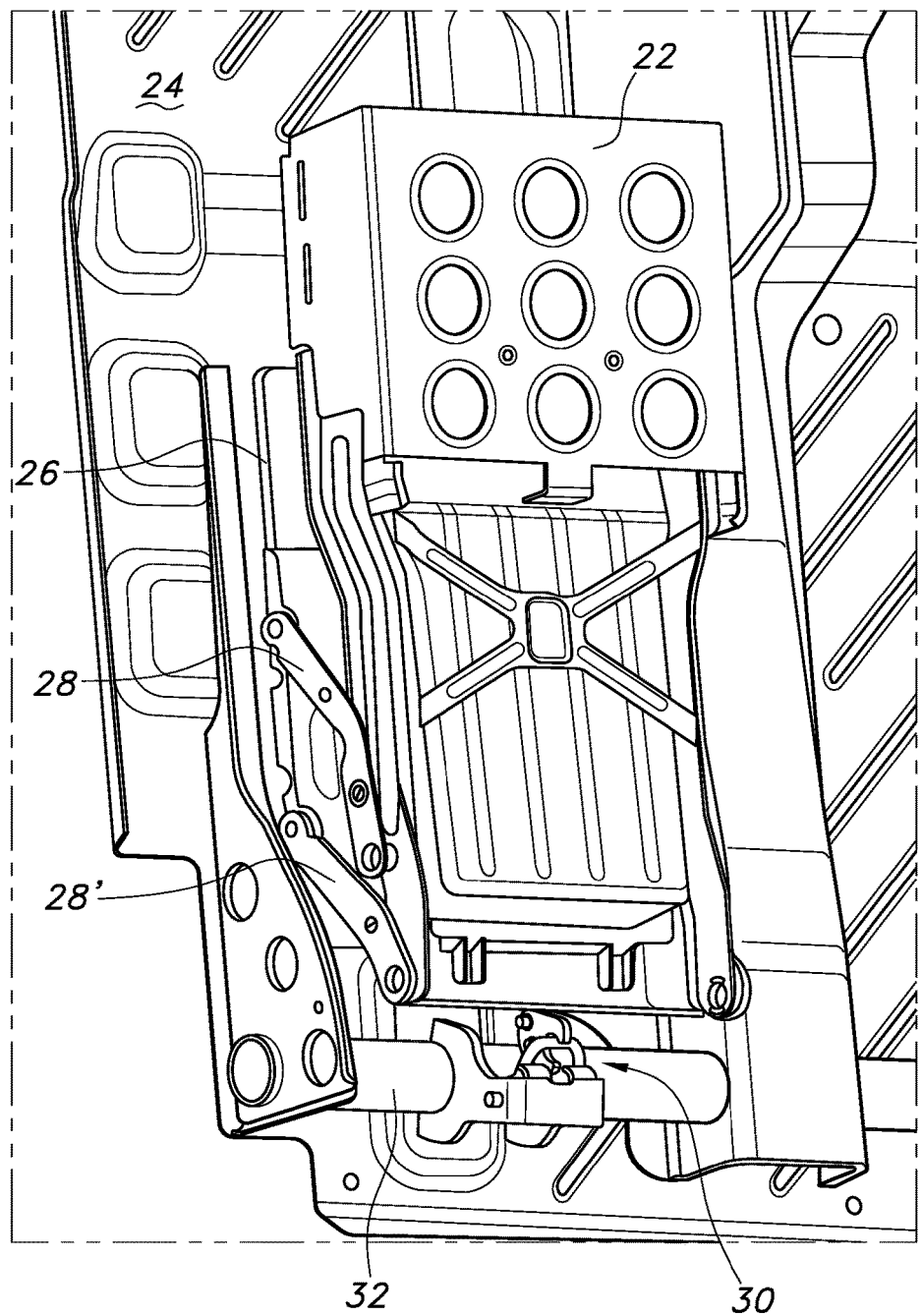
FIG. 2 shows a side perspective view of a center armrest frame in a stowed configuration, including an locking assembly according to the present disclosure.

FIG. 2 shows an isolated view of a pivoting center armrest frame 22 mounted to a seat back frame 24 by an attachment bracket 26. A pair of pivoting links 28, 28' journaled at one end to the attachment bracket 26 and at an opposed end to the armrest frame 22 allow translation of the armrest from the upright, stowed configuration shown in FIG. 2 to a deployed configuration. As will be appreciated, links 28, 28' may be disposed at each side of the armrest frame 22, although only the near-side links 28, 28' are visible in FIG. 2. An armrest lock assembly 30 that will be described in greater detail below is disposed at a bottom of the armrest frame 22. A single centrally disposed armrest lock assembly 30 is depicted, although it will be appreciated that one or more lock assemblies 30 could be disposed as shown and as will be described. In the depicted embodiment, the armrest lock assembly 30 is disposed below the armrest frame 22 and adjacent a seat back frame 24 cross tube 32.

Figure 3:
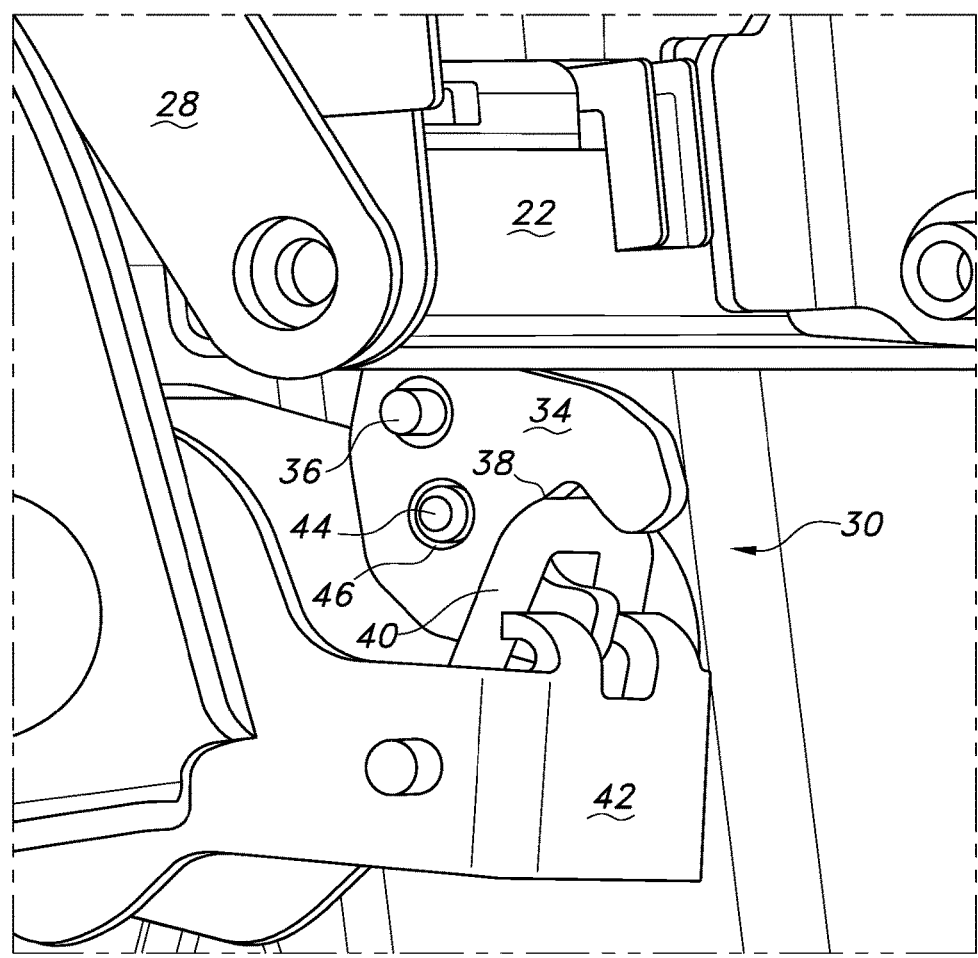
FIG. 3 is an isolated view of the locking assembly of FIG. 2, showing a catch member engaging a catch wire and a stop pin engaging the catch member.

With reference to FIG. 3, the armrest lock assembly 30 includes a pivoting catch member 34 disposed below the armrest frame 22 for pivoting relative to an axis. In the depicted embodiment, the pivoting axis is provided by a pivot pin 36. In the depicted embodiment the catch member 34 comprises a substantially hook- or U-shaped configuration defining a receiver 38. The receiver 38 is configured to engage a catch wire 40 which is mounted to the seat back frame 24. In the depicted embodiment, the catch wire 40 is mounted to the seat back frame cross tube 32 (not visible in this view) by a bracket 42.

The depicted engagement of catch member 34 and catch wire 40 is preserved by a retractable stop pin 44 configured to engage catch member 34. As shown, retractable stop pin 44 engages catch member 34 via aperture 46. However, it will be appreciated that alternative configurations are possible and so contemplated herein, such as a recess in catch member 34 configured to engage retractable stop pin 44.

Figure 4A:
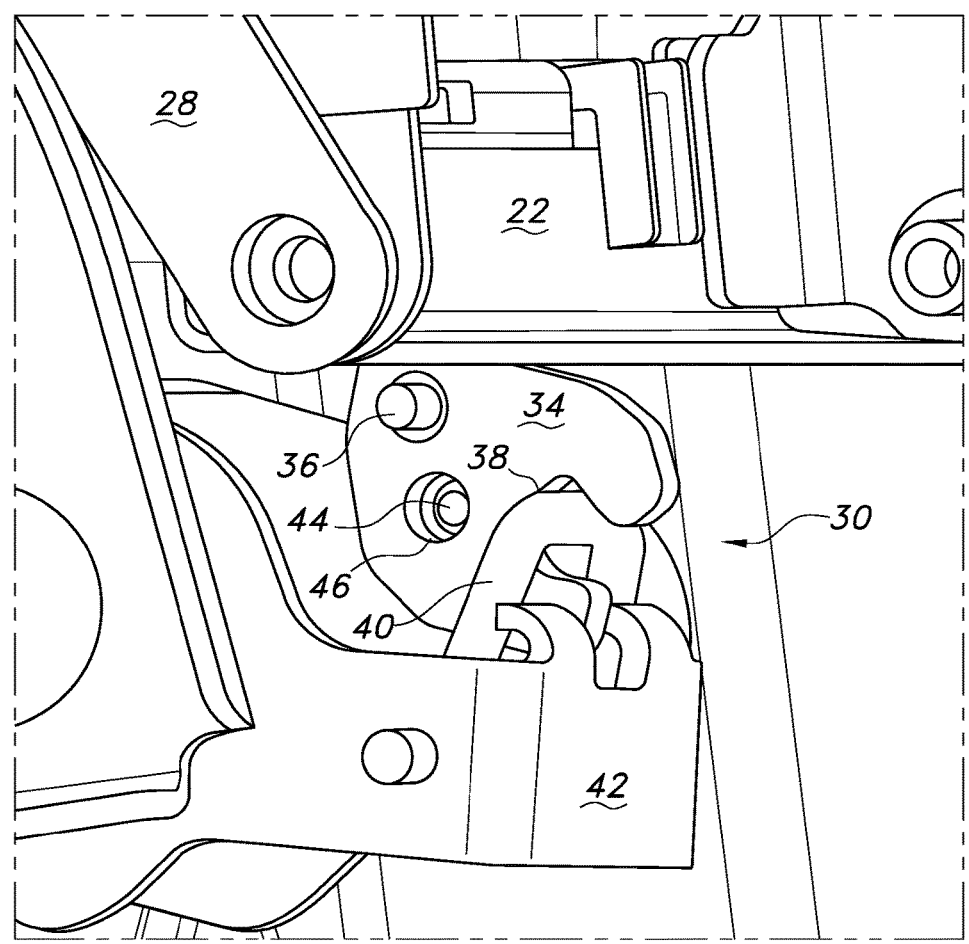
FIG. 4A shows the isolated side view of the locking assembly of FIG. 3, with the stop pin disengaging from the catch member.
Figure 4B:
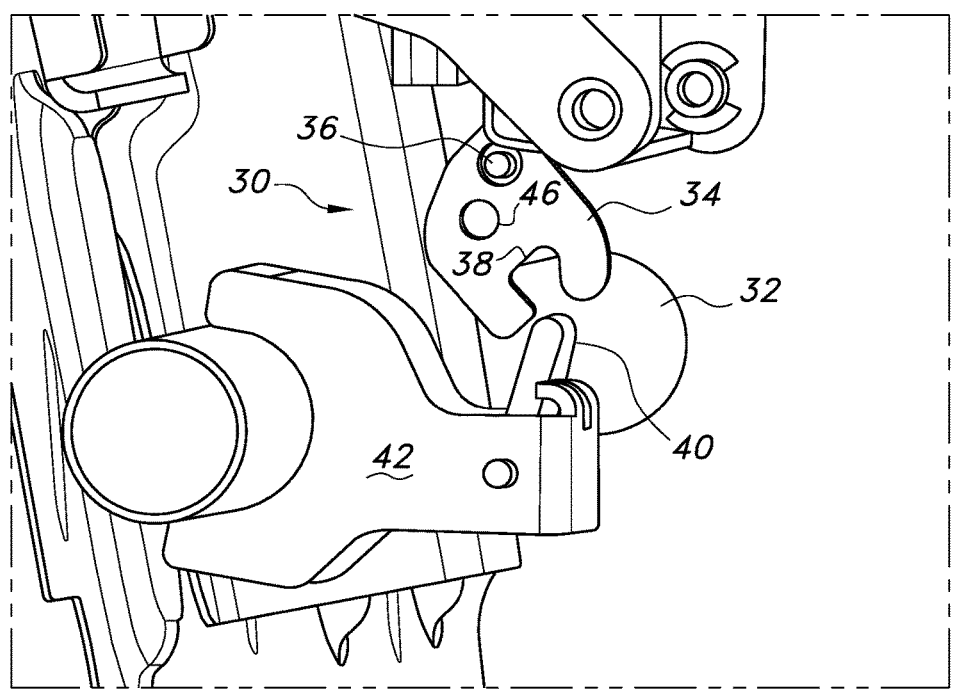
FIG. 4B shows the stop pin disengaged from the catch member for deployment of the center armrest.
Figure 5:
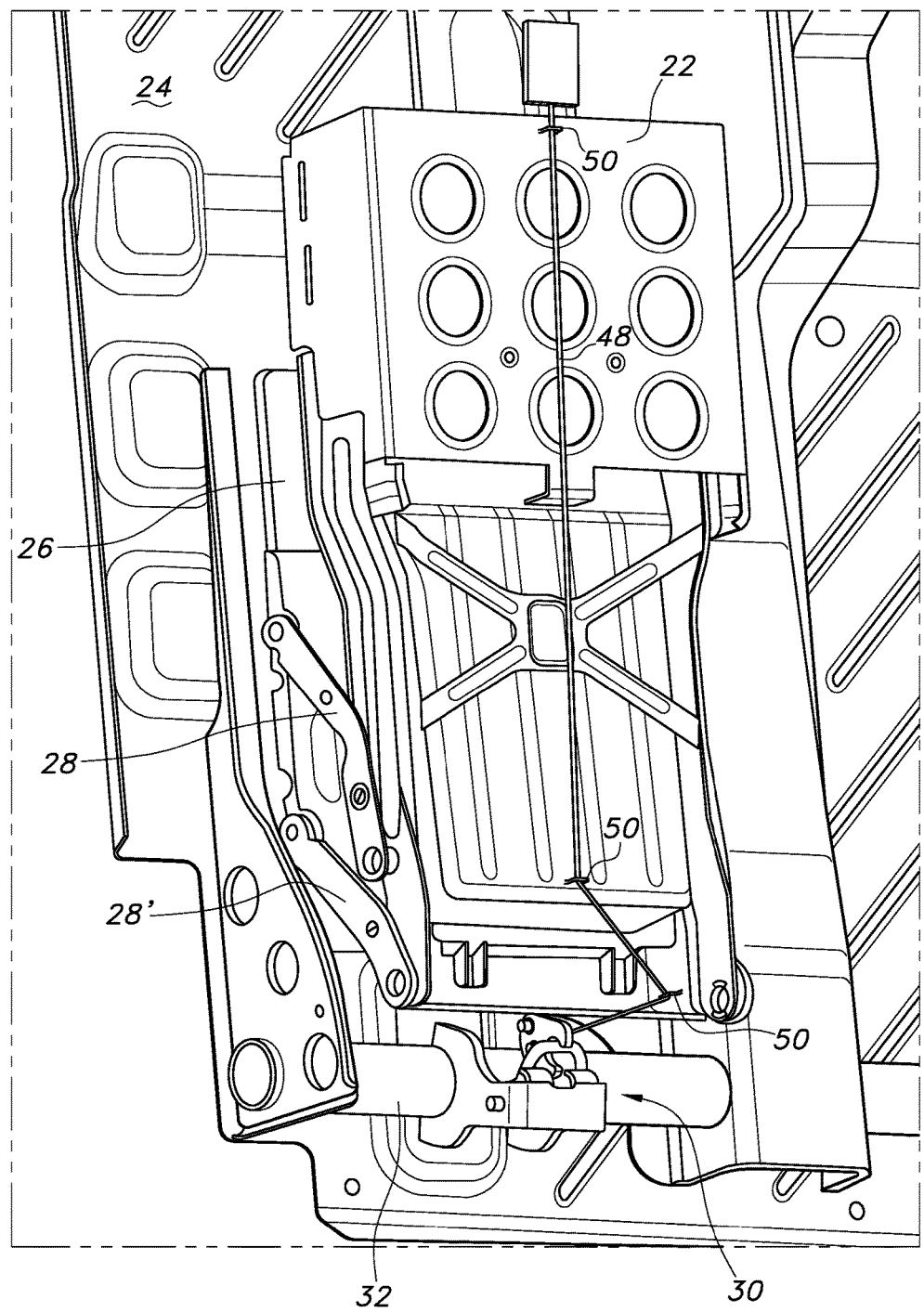
FIG. 5 shows an embodiment of an arrangement for disengaging the stop pin from the catch member.

In one embodiment (see FIG. 5), stop pin 44 is actuated by a cable 48 operatively linked to handle 21. As shown, cable 48 may be routed through one or more guides 50 in order to ensure that a pulling force is applied in the proper direction to retract the stop pin 44. Therefore, to deploy the armrest, the user need only pull handle 21 to translate the armrest 14 from the upright and stowed configuration (see FIG. 1) to a deployed configuration. Pulling on the handle 21 (which may be provided in any suitable or desirable configuration, such as a pull strap or loop) causes the cable 48 to disengage the stop pin 44 from the aperture 46. As shown in FIG. 4B, this allows the catch member 34 to pivot and release the catch wire 40, and the armrest 14 can be deployed. On restoring the armrest 14 to the upright, stowed configuration, the catch member re-engages catch wire 40, and the stop pin, being spring-loaded, re-engages the aperture 46. Of course, alternative arrangements for disengaging stop pin 44 are possible and contemplated for use herein.

On the other hand, in the event of a sudden vehicle deceleration such as an emergency braking action, a frontal impact to the vehicle, or the like, the user would not have pulled the handle 21. Therefore, the stop pin 44 would not disengage from aperture 46 and cause catch member 34 to pivot and release the catch wire 40, and the armrest 14 would not deployed. By this mechanism, inadvertent and undesirable deployment of the armrest during a sudden deceleration of the vehicle is prevented.

The benefits of the presently disclosed armrest locking assembly 30 are apparent. A relatively uncomplex and robust locking mechanism is provided for preventing inadvertent deployment of a center seat armrest during vehicle deceleration, while still allowing normal deployment of the armrest by a passenger, without requiring any specific lock release mechanism. Obvious modifications and variations are possible in light of the above teachings. All such modifications and variations are within the scope of the appended claims when interpreted in accordance with the breadth to which they are fairly, legally and equitably entitled.

What is claimed:

1. A locking assembly for a vehicle armrest, comprising:
a pivoting catch member disposed below an armrest body;
a catch wire disposed on a seat back frame member;
a retractable stop pin for maintaining an engagement of the pivoting catch member and the catch wire; and
a release operatively connected to the retractable stop pin.

2. The locking assembly of claim 1, wherein the catch member pivots about a pivot pin disposed on an armrest frame member.

3. The locking assembly of claim 1, wherein the release is a handle for translating the armrest body between an upright stowed configuration and a partially or fully deployed configuration.

4. The locking assembly of claim 3, wherein the handle is configured as a pull strap.

5. An armrest assembly for a vehicle, comprising:
an armrest including at least: an armrest body, an attachment bracket for pivotally attaching the armrest body to a seat assembly, at least one link journaled at one end to the attachment bracket and at an opposed end to the armrest body, and a release for translating the armrest body between an upright stowed configuration and a partially or fully deployed configuration; and
a locking assembly including a pivoting catch member disposed below the armrest body, a catch wire disposed on a seat back frame member, and a retractable stop pin for maintaining an engagement of the pivoting catch member and the catch wire, the retractable stop pin being operatively connected to the release.

6. The armrest assembly of claim 5, wherein the catch member pivots about a pivot pin disposed on an armrest frame member.

7. The armrest assembly of claim 5, wherein the release is a handle for translating the armrest body between an upright stowed configuration and a partially or fully deployed configuration.

8. The armrest assembly of claim 7, wherein the handle is configured as a pull strap.

9. A vehicle including the armrest assembly of claim 5.

10. A locking assembly for a vehicle armrest, comprising:
a pivoting catch member disposed below an armrest body and defining a receiver for capturing a catch wire disposed on a seat back frame member;
a retractable stop pin for maintaining an engagement of the pivoting catch member and the catch wire; and
a release operatively connected to the retractable stop pin.

11. The locking assembly of claim 10, wherein the catch member pivots about a pivot pin disposed on an armrest frame member.

12. The locking assembly of claim 10, wherein the release is a handle for translating the armrest body between an upright stowed configuration and a partially or fully deployed configuration.

13. The locking assembly of claim 12, wherein the handle is configured as a pull strap.

14. An armrest assembly including the locking assembly of claim 10.

15. A vehicle seat assembly including the armrest assembly of claim 14.

16. A vehicle including the vehicle seat assembly of claim 15.

* * * * *